United States Patent [19]

Chestnut

[11] Patent Number: 5,444,227

[45] Date of Patent: Aug. 22, 1995

[54] HEATER APPARATUS FOR USE IN A LIQUID ENVIRONMENT

[75] Inventor: M. Gaines Chestnut, Golden, Colo.

[73] Assignee: Warner-Lambert Company, Morris Plains, N.J.

[21] Appl. No.: 893,095

[22] Filed: Jun. 2, 1992

[51] Int. Cl.[6] .............................................. H05B 1/02
[52] U.S. Cl. ...................... 219/506; 219/523; 219/528; 219/502; 219/497; 116/286; 116/256
[58] Field of Search ................ 219/523, 528, 497, 494, 219/506, 502, 306; 116/286, 287, 256, 257, 263

[56] References Cited

U.S. PATENT DOCUMENTS

| 2,554,745 | 5/1951 | Kapsch | 219/523 |
|---|---|---|---|
| 3,576,426 | 4/1971 | Sesholtz | 219/523 |
| 3,677,619 | 7/1972 | Mackenzie | 116/287 |
| 3,868,923 | 3/1975 | Lambas | 116/287 |
| 3,916,317 | 10/1975 | Gibson et al. | 416/257 |
| 4,007,371 | 2/1977 | Njos et al. | 219/523 |
| 4,326,121 | 4/1982 | Welsby et al. | 219/523 |
| 4,983,813 | 1/1991 | Van Tulleken et al. | 219/512 |

FOREIGN PATENT DOCUMENTS

| 0087311 | 8/1921 | Austria | 219/523 |
|---|---|---|---|
| 0253542 | 1/1988 | European Pat. Off. | |
| 0379313 | 7/1990 | European Pat. Off. | |

Primary Examiner—Mark H. Paschall
Attorney, Agent, or Firm—Sheridan Ross & McIntosh

[57] ABSTRACT

An improved heater and control apparatus (10) suitable for maintaining a proper temperature in a liquid environment such as an aquarium (12) is provided. The apparatus (10) includes a heater element (26) housed within a protective casing (28) to reduce the likelihood of heater element (26) breakage. A number of openings (30) are provided in casing (28) to permit direct contact between the heater element (26) and water in the aquarium (12). The control assembly (16) includes a novel active light display (99). Additional novel features and corresponding advantages of the apparatus (10) are disclosed.

43 Claims, 14 Drawing Sheets

HEATER APPARATUS FOR USE IN A LIQUID ENVIRONMENT

BACKGROUND OF THE INVENTION

1. Field of the Invention

The present invention relates generally to heating systems and, in particular, to a heater and control apparatus that includes a visual temperature indicator and that is suitable for maintaining a proper temperature in a liquid environment such as an aquarium, horse water tank, dog, cat or other pet bowl, terrarium water container, fish or garden pond and other similar usages.

2. Description of the Related Art

A variety of heating systems have been developed to maintain liquids at a proper temperature. For example, heating systems have been developed to maintain the water in aquariums at a proper temperature, typically between about 68°-82° F. for tropical fish and/or various aquatic plants. Generally, such heating systems include an electrical heater element interconnected to a thermostat control device such as a bimetallic temperature sensor/switch unit. The control device usually includes a temperature setting controller, such as a control knob, and a sensor intended to provide aquarium water temperature feedback. The control device is therefore supposed to compare the aquarium water temperature to a desired temperature and control operation of the heating element in response to the comparison.

Common types of aquarium heating systems include the "test tube" systems. In the test tube systems, the heater element is housed within a test-tube shaped casing, which is usually made of glass. The heater element heats the air inside the casing such that heat is transferred from the heater element, by way of convection to the air and casing, then via conduction to the water in the aquarium. Another type of aquarium heating system, hereinafter referred to as a mat system, employs a heater element that is contained within a mat of plastic or resinous material. Heat is transferred from the heater element to the water by way of conduction through the mat.

A problem associated with known aquarium heating systems is the tendency of the heater elements or casings to break. Test tube casings, which are typically made of glass, may break due to handling or thermal shock from rapid temperature changes, e.g., due to being heated and then submerged in cold water. Although plastic casings for test tube heating systems have been proposed, such casings fail to adequately protect the heater element which typically comprises a fragile, narrow gauge wire, under certain circumstances. Further, it has been found that the plastic serves as a barrier to efficient heat transfer due to its inherent poor thermal conductivity. Mat systems also fail to adequately protect the heater element under certain circumstances. For example, a blow to the mat can result in the heating element being severed and thereby rendered inoperable.

Another problem associated with known aquarium heating systems is that they are relatively inefficient in transferring heat from the heater element to the water. In the case of test tube systems, heat is transferred from the heater element to the water by way of air inside the test tube and the structural casing, thus entailing significant losses and thermal time lags. In this regard, it will be appreciated that such casings have a thickness sufficient to meet structural requirements and are commonly formed from materials having relatively poor thermal conduction properties, thereby impairing heat transfer. Likewise, in mat systems, heat is transferred from the heating element to the water by way of relatively thick, structural matting. Although the matting materials utilized in such heaters are sometimes characterized in the literature as having good thermal conductivity properties, in reality the matting materials utilized, which also commonly provide electric insulation, are relatively insulative.

A further problem associated with mat systems is that such systems may experience thermal damage in use. The present inventors have attempted to practice the teachings of the proposed mat systems and have found that systems so constructed tend to melt or burn. It has been determined that this is due, at least in part, to the relatively low heat transfer coefficient associated with the insulative matting material. As a result, heat cannot be carried away from the heating element fast enough to prevent the temperature of the heating element from rising to a point at which it melts or burns. Moreover, such systems have not been found on the market.

A still further problem associated with known aquarium heaters is that such heaters can pose a safety hazard, particularly when misused. In one such referenced system, water temperature feedback control aquarium heaters, the water temperature sensor can become located outside of the water due to a drop in the aquarium water level or other reason. Accordingly, the sensor may provide feedback related to ambient air temperature rather than water temperature, thereby causing the heater to continually heat the water, potentially harming the fish and/or plants in the aquarium.

In addition, in some known aquarium heater systems, the heater element can quickly become heated to dangerous temperatures if the heater element comes out of the water. Such temperatures can result in thermal damage to the heater element and may create a fire hazard.

Yet another problem associated with known heating systems is that conventional dials or gauges utilized to set the desired water temperature, which depend on passive light, such as reflected ambient light, to provide an indication of temperature, may be difficult to read in certain lighting conditions. For example, conventional dials or gauges commonly comprise a scale of temperature markings mounted on a rotatable knob. The desired temperature set point can thus be indicated by rotating the knob to align the marking corresponding to the desired setting with a notch adjacent to the knob. As is readily appreciated, such dials or gauges may be difficult to read when the aquarium is kept in a poorly lit area and/or the aquarium lighting is turned off to simulate nighttime conditions. In addition, the markings of the scale may wear off or otherwise become difficult to read, thereby rendering the temperature setting uncertain.

Known aquarium heating systems are also relatively difficult to assemble at the factory level. Assembly of such systems typically involves many steps wherein various components are positioned and interconnected prior to closing and sealing the heating system casing. As is readily appreciated, such processes are relatively complex and time consuming, thereby adding to assembly costs.

In addition, known aquarium heating systems generally include control circuitry which can become overheated unless adequate heat dissipation is provided.

Thus, a thermally conductive link is typically inserted between the heating system casing and elements of the control circuitry to dissipate heat generated when the control circuitry is active. Installing such a link further contributes to the complexity of heating system assembly. In addition, such a link may provide inadequate heat dissipation.

An additional problem associated with known aquarium heating systems relates to providing reliable connections between electrical wires. In constructing aquarium heating assemblies, it is sometimes necessary or desirable to interconnect electrical wires of different thicknesses or gauges. For example, heater elements commonly comprise a narrow gauge wire whereas the wires interconnecting the heater element to other elements of the heating system are usually thicker. Interconnections between wires of different gauges may tend to fail under tension if the wires are simply crimped or soldered together. The problem of failing interconnections is exacerbated where the interconnections are located underwater. Known mechanisms and methods for interconnecting wires of different gauges underwater are expensive and complex.

SUMMARY OF THE INVENTION

The present invention discloses an aquarium heater and control apparatus which substantially reduces or eliminates the problems discussed above.

According to one aspect of the present invention, an aquarium heater assembly is provided which substantially reduces or eliminates the heater element breakage problems discussed above. The present inventors have recognized that heating element casings in many circumstances are subjected to stresses greater than conventional casings can withstand. In particular, test tube casings made of glass are easily broken. Further, test tube casings made of plastic may flex when loaded such that the casing contacts and breaks or otherwise damages the heater element. Similarly, the heater element in mat systems may break or become damaged due to a blow to the mat or flexing of the mat which sandwiches the heater element. A heater assembly constructed in accordance with the present invention includes a heater element disposed between first and second walls of a housing and a mechanism for protecting the heater element against impact forces. The mechanism can include at least one protrusion extending from one of the walls toward the other wall. The protrusions may extend from either or both walls of the housing and may extend partially or completely across the distance between the walls. The protrusions can define a space between the walls having a height which is at least as great as a thickness of the heater element thereby reducing the likelihood that the element will break if a wall flexes due to impact forces. This space can be provided by way of individual protrusions having such a height or by way of opposing protrusions which combinatively provide such a height. The heater element is, in effect, protected by shrouding of the forces of impact, compressive forces, or cutting by the walls of the housing or intermediate structural components such that substantial deformation would have to occur before any degradation or damage to the heating element or wire could occur. In addition, the housing can be constructed from an impact resistant material which resists breakage such as polycarbonate polymer resin.

According to another aspect of the present invention, a heater assembly having improved heat transfer efficiency is provided. The present inventors have found that conventional heating systems tend to insulate the heater element from the water. In addition, in proposed mat systems, the interfaces between the mat and water are generally planar and therefore provide relatively little heat transfer area. An assembly constructed in accordance with the present invention includes a heater element in direct contact with water in an aquarium. The element can be an electrical resistance wire submerged in the water such that the wire contacts the water substantially continuously about a circumferential extent thereof. In this regard, the element can be housed within a casing having at least one opening to allow penetration of water.

According to a still further aspect of the present invention, an aquarium heater assembly is provided which reduces the risk present in mat type systems of the heating element overheating and becoming inoperative. The present inventors have found that in proposed mat heaters, wherein the heater element commonly comprises an electrical wire formed into a serpentine pattern, heat can be concentrated at certain areas of the heater element resulting in the heater element being rendered inoperative. This problem is addressed in accordance with the present invention by providing a heater element configured so as to provide a substantially uniform heat distribution thereacross. The heater element can be formed in a spiral configuration such that the radial spacing between adjacent portions of the heater element near the center of the spiral is greater than at more outward portions of the spiral. For example, progressing radially outwards from the center of the spiral, the radial spacing between adjacent portions of the heating element can become progressively shorter, e.g., the spacing between each pair of adjacent portions can be approximately 80% of the spacing between the immediately preceding pair of adjacent portions.

According to a further aspect of the present invention, an aquarium heater assembly is provided which reduces the likelihood that the aquarium water will be heated to temperatures which could harm fish and/or plants in the aquarium. Conventional heaters may heat the water to dangerous temperatures if the water temperature sensor becomes located outside of the water. An assembly constructed in accordance with the present invention provides increased assurance that the water temperature sensor will remain submerged. The position of the sensor is fixed near the bottom of the aquarium to reduce the likelihood that the sensor will emerge from the water. For example, the sensor may be interconnected directly or indirectly to a bottom portion of the tank, sand, gravel, decorations, an undergravel filter or other aquarium components near the bottom of the tank. In this regard, the sensor can be interconnected with a line from the controller to the heating element.

In addition, in accordance with the present invention, an assembly for limiting the temperature of an aquarium heater element is, in some embodiments, provided to further reduce the risk of fire or thermal damage. The present inventors have found that the conventional control circuitry may react too slowly in shutting down a heater element that has been removed from the water. Consequently, the heater element may reach a dangerous temperature at which it may pose a fire hazard. An assembly constructed in accordance with the present invention includes a thermostat, a bimetallic thermostat in one embodiment, which allows current flow to the heater element when the temperature of the element indicates that the element is submerged in water, but substantially prevents current flow when the temperature of the element indicates that the element has come out of the water. The thermostat, in one embodiment, includes a thermal contact element which extends about a circumferential portion of the heater element to enhance thermal transfer from the heater element to the thermostat.

According to an additional aspect of the present invention, a heater and control apparatus including an improved controller assembly is provided. Conventional controller assemblies commonly depend upon passive, reflected ambient light to permit reading of the temperature setting dial or gauge. When lighting conditions are poor, setting the temperature becomes difficult and uncertain. Further, if the markings on the dial or gauge are worn off, it becomes difficult to achieve a desired temperature setting. A controller assembly constructed in accordance with the present invention includes a light source for providing a beam of light and a mechanism for moving the beam of light to provide temperature related information. For example, the beam of light can be moved to a selected portion of a scale to provide the temperature related information. The mechanism for moving the beam of light can comprise at least one element, such as an optical strand or tube, defining a light transmission path from the source to, for example, a scale. In this regard, a single moveable element and/or a plurality of stationary elements to which the beam of light is selectively applied can be used. A rotatable cover having an opening therein for passage of light and disposed between the light source and the plurality of stationary elements can be used to apply the beam of light to a selected one of the elements. A temperature selection device, such as a knob, can be operationally associated with both the mechanism for moving the beam of light to provide temperature related information and a regulator for controlling operation of a heater element so that temperature related information provided is correlated with the operation of the heating element.

According to a further aspect of the present invention, an easily assembled control unit is provided. The controller unit includes control circuitry having at least one heat producing element, the heat producing element including an integral heat dissipating surface, and a casing to house the circuit including an integral heat conductive surface. The control circuitry and casing are adapted such that the heat dissipating surface and the heat conductive surface are brought into thermal contact when the circuitry is inserted into the casing. In this regard, the heat dissipating surface and the heat conductive surface can be of complementary shapes and can be positioned so that the surfaces securely interface when the circuitry is inserted into the casing. The surfaces can be matingly engageable or provided with complementary external surfaces to facilitate engagement.

According to another aspect of the invention, an aquarium heater and control apparatus including an assembly for interconnecting electrical leads underwater is provided. The interconnecting assembly includes a substantially rigid sleeve and a pair of compressible stoppers wherein the stoppers and sleeve are dimensioned such that the stopper can be compressingly received within open ends of the sleeve. Each of the stoppers has an opening to receive an electrical lead therethrough so that the leads can be interconnected inside the sleeve. A substantially waterproof seal is formed between the stoppers and the sleeve when the stoppers are compressingly received within the open ends of the sleeve. In addition, the leads are frictionally engaged within the stoppers when the stoppers are frictionally received within the open ends of the sleeve, thereby substantially reducing or eliminating tension at the interconnection between the leads.

BRIEF DESCRIPTION OF THE DRAWINGS

For a more complete understanding of the present invention and for further advantages thereof, reference is now made to the following detailed description in which.

DETAILED DESCRIPTION OF THE INVENTION

Figure 1:
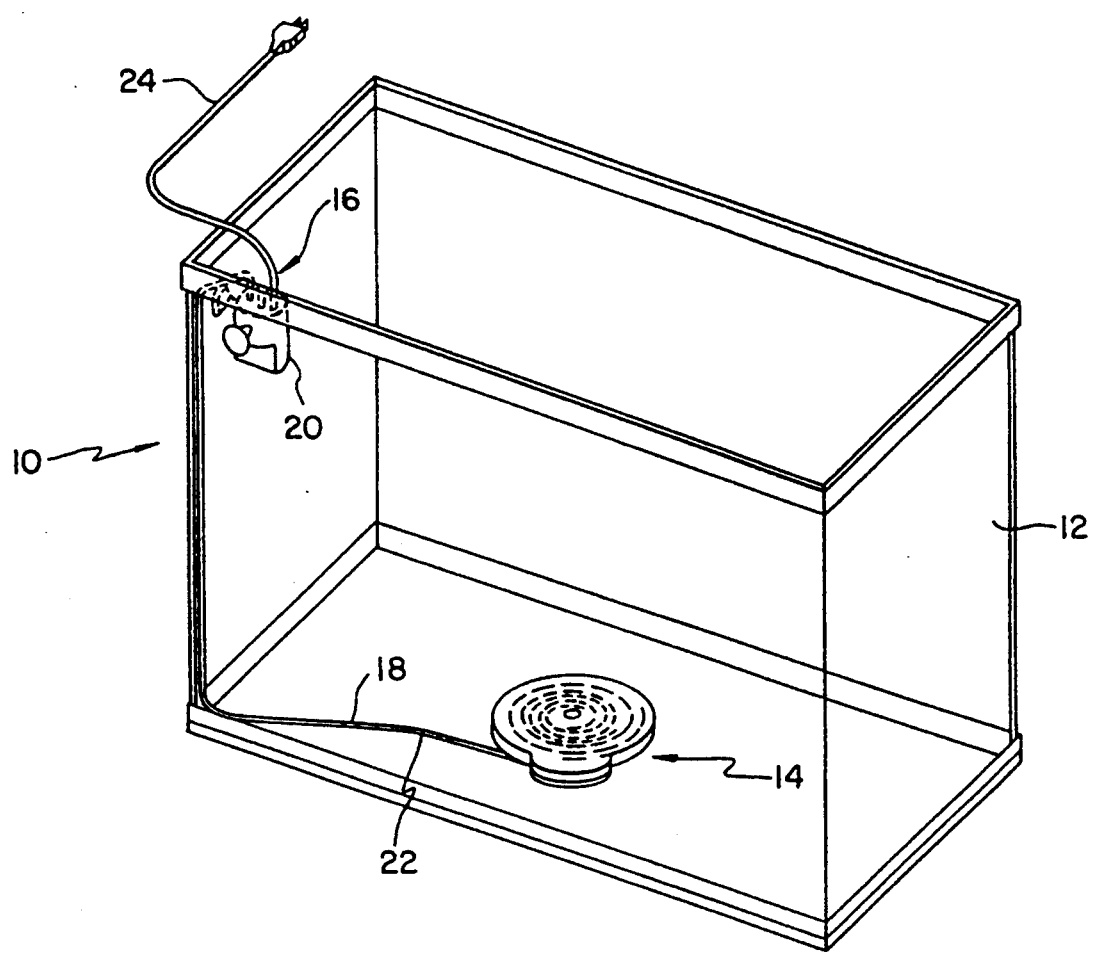
FIG. 1 is a perspective view of an apparatus constructed in accordance with the present invention.

Referring to FIG. 1, an apparatus constructed in accordance with the present invention is generally identified by the reference numeral 10. Although the apparatus 10 is depicted in an aquarium 12, the apparatus 10 is suitable for use in maintaining proper temperature control in a variety of liquid environments. Generally, the apparatus 10 comprises a heater assembly 14 for heating water in the aquarium 12; a control assembly 16 including a water temperature sensor 18 and a control unit housing 20; an electrical line 22 interconnecting the heater assembly 14 and control assembly 16; and a power supply cord 24 for interconnecting the apparatus 10 to a power source.

Figure 2:
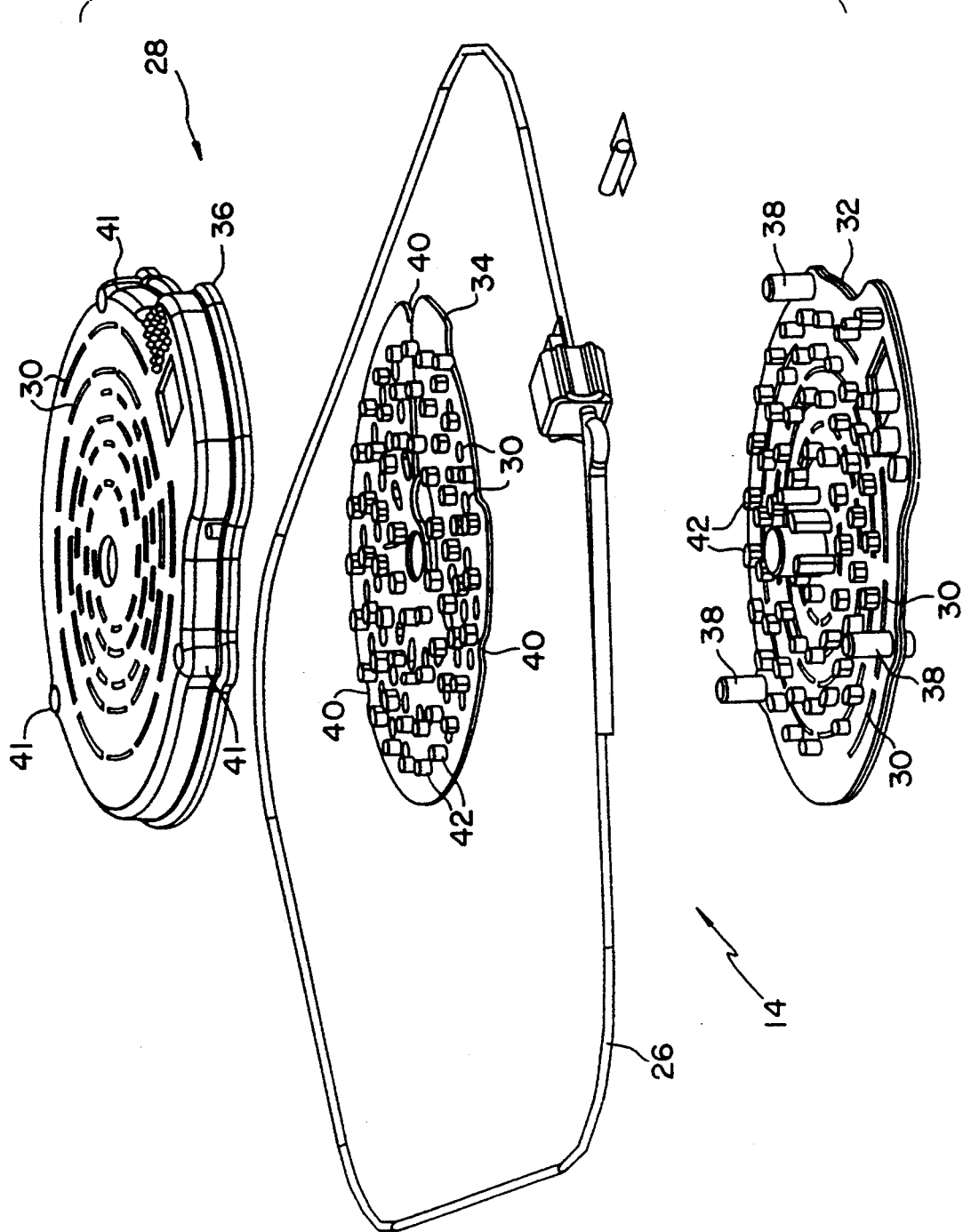
FIG. 2 is an exploded view of a heater assembly.
Figure 3:
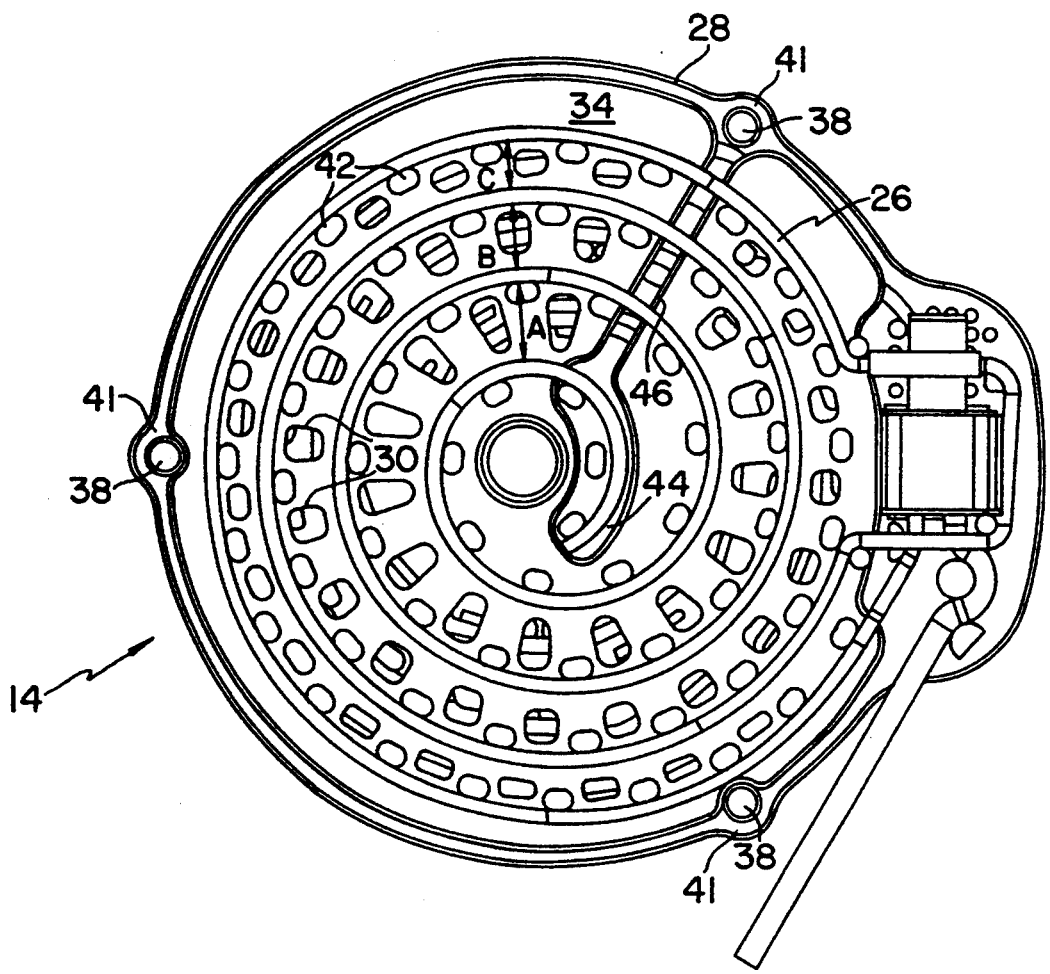
FIG. 3 is a top view, partially cut away, of the heater assembly of FIG. 2.

Referring to FIGS. 2 and 3, an exploded, perspective view and a top view, partially cut away, respectively, of the heater assembly 14 are shown. The assembly 14 can be positioned horizontally under sand or gravel near the bottom of the aquarium 12 (FIG. 1) to enhance aquarium aesthetics and heat distribution, or within or adjacent to decorations. The assembly 14 includes a heater element 26 housed within a protective casing 28. The heater element 26 comprises an electrical resistance wire which can be a braided or other easily workable wire for ease of construction. As will be appreciated from the description below, the heater element 26 directly contacts water in the aquarium 12 about substantially its entire circumferential extent. The wire is thus coated with a material, such as a suitable plastic, rubber or resinous material, which electrically insulates the wire from water in the aquarium 12, but permits heat transfer from the wire to the water. It is an advantage of the present invention that a relatively narrow thickness of such material can be utilized, thereby enhancing heat transfer, because the heater element 26 is protected against impact stress and structural loading.

The casing 28 houses the heater element 26 and related components in a manner which permits direct contact between the heater element 26 and water in the aquarium 12. In this regard, the casing can be constructed from a porous material or provided with at least one opening to allow penetration of water. In the illustrated embodiment, the casing 28 is provided with a plurality of openings 30 to allow water to pass into and through the casing 28. The openings 30 can be dimensioned and positioned so as to reduce the likelihood of accidental damage to the heating element due to penetration of cleaning instruments and the like therethrough while facilitating adequate water flow around substantially the entire circumferential extent of the heater element 26 to provide for efficient heating of the aquarium 12. As shown, the openings 30 through the external surfaces of the casing 28 comprise a relatively large number of slits, offset from the adjacent heater element 26, arranged in a spiral pattern.

The illustrated casing 28 is constructed in three parts: a base 32, a central divider 34 and an upper cover 36. As will be better understood upon consideration of the description below, it is desirable to maintain the relative positioning and orientation of the base 32, divider 34 and cover 36 substantially constant thereby reducing stress on the heater element 26. In this regard, a rod, post or other member can be utilized to interconnect the base 32, divider 34 and cover 36 so as to maintain the relative positioning and alignment therebetween. In the illustrated embodiment, the base 32 includes a plurality of upwardly projecting alignment posts 38 which are received within complementary indentations 40 of the divider 34, and corresponding press fit holes 41 in the cover 36. In addition, peripheral portions of the base 32, divider 34 and cover 36 are formed in complementary shapes to further assist in positioning and alignment. The casing 28 is preferably formed from a material which resists breaking or cracking due to loading or thermal stress. Thus, for example, the casing 38 may be formed from a suitable plastic or resinous material such as a polycarbonate material. The base 32, divider 34 and cover 36 can be interconnected by any appropriate means, including, for example, friction fitting, adhesive bonding or ultrasonic welding.

The casing 28 can be provided with at least one stiffening or dampening member to protect the heating element 26 against damage in the event that the casing flexes due to impact forces. The stiffening or damping member may comprise protrusions positioned inside the casing 28 to substantially prevent damaging contact between the casing 28 and the heater element 26 when the casing 28 flexes. In the illustrated embodiment, the casing 28 includes a plurality of protective guide posts 42 which project upwardly from the base 32 and divider 34. The posts 42 should have a height which is at least as great as the thickness of the heater element 26 so as to effectively shield the heater element 26 against harmful impact. In addition, the posts can have a smooth outer contact surface to reduce frictional wear or damage to the heater element 26.

The posts 42 are also useful in forming and maintaining the desired pattern and spacing of the heater element 26 and holding the heater element 26 in place during the assembly process. It is desirable to form the heater element so as to provide relatively uniform heat distribution across the heater element assembly 14 as opposed to crossovers or sharp U-bends in the heater element 26 which contribute to high thermal gradients. In addition, the heater element 26, which forms part of a closed electrical circuit, should be formed so as to prevent overlap of the heater element 26, thereby reducing the likelihood of thermal damage. The posts 42 geometrically define a spiraling pathway for the heater element 26 which has been found to provide improved heat distribution. As shown, the heater element 26 is wound about the posts 42 so that the heater element 26 spirals inwardly on the divider 34, passes through an appropriately positioned and shaped opening 44 in the divider 34, and spirals outwardly on the base 32 avoiding overlap of the heater element 26. Obviously, the heater element 26 could be wound inwardly on the base 32 and outwardly on the divider 34. The rotational senses of the spiral pathways of the base and divider can be opposite, e.g., one provided with a right hand spiral pathway and the other with a lift hand spiral pathway, thereby facilitating smooth transition between the base 32 and divider 34 pathways. The divider 34 can include a slit 46 from an outer edge thereof to the opening 44 to allow radial passage of the heater element 26 thereby simplifying construction. Heat distribution is further enhanced by providing increased spacing between radially adjacent portions of the heater element 26 towards the center of the spiral to prevent a hot spot at the center of the spiral. The illustrated spiral is formed such that, progressing outwardly from the center of the spiral, the spacing between each pair of radially adjacent portions of the heater element 26 is 0.8 times the spacing between the immediately preceding pair. For example, the distance "B" between the second and third turns of the heater element 26 is approximately 0.8 times the distance "A" between the first and second turns of the heater element 26. Likewise, the distance "C" is approximately 0.8 B. Other spacings are also feasible.

Figure 4:
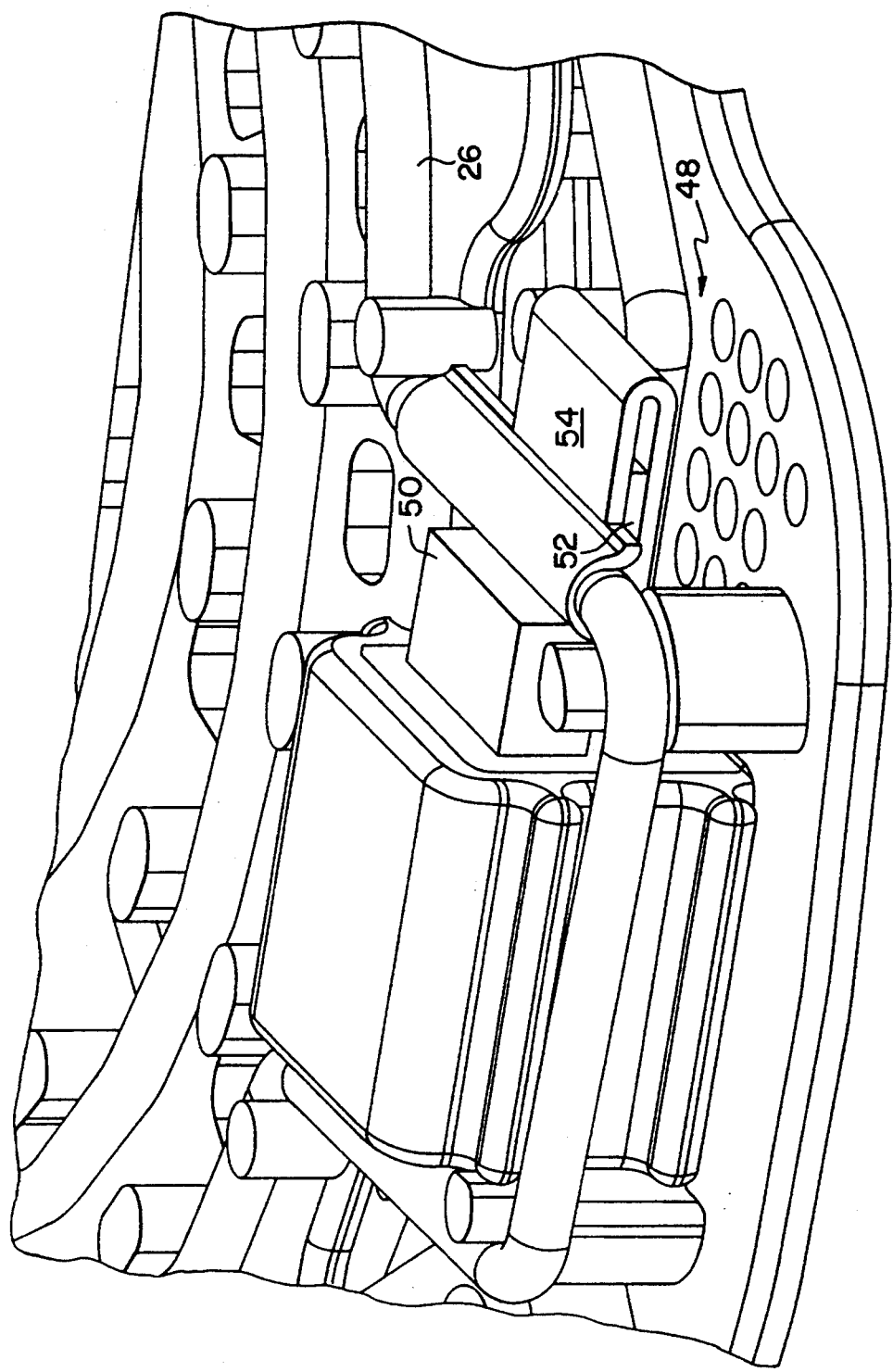
FIG. 4 is a perspective view of a device for making sealed electrical connections and/or limiting the temperature of a heater element.

Referring to FIG. 4, a perspective view of a device 48 for limiting the temperature of the heater element 26 is shown. As will be understood, absent a temperature limiting device, the heater element 26 could be quickly heated to damaging or dangerous temperatures if the heater element 26 emerged from the water because air is a poor heat conductor in comparison to water. Accordingly, a device 48 slows or stops current flow to the heater element 26 when the temperature of the element 26 indicates that the element has emerged from the water. In this regard, the device 48 comprises a thermostat 50 for slowing or switching off current flow to the heater element 26 in response to the heater element 26 exceeding a defined temperature. In the illustrated embodiment, the device 48 comprises a thermostat 50 (an encapsulated bimetallic strip) that is in thermal communication and in electrical series with the heater element 26 and has thermal response characteristics selected such that current flow through the heater element 26 is diminished or substantially shut off when the heater element 26 emerges from the water and exceeds a defined temperature. The device 48 includes a thermally conductive fin 52 integral with the thermostat 50, and a thermally conductive clip 54 that cooperate to thermally connect the thermostat 50 and the heating element 26. The clip 54 provides an increased heat transfer surface area over that provided by the fin 52 so that the thermostat 50 is more responsive than it would otherwise be when the heater element is in an air environment in which heat transfer from the heater element 26 is primarily dependent upon convection, which dissipates heat much less rapidly relative to the conductive heat transfer attained when the heating element 26 is in the water. Stated another way, the clip 54 facilitates a balance between the conductivity of water and the connection of air. In this regard, the fin 52 and clip 54 are configured so that a portion of the heater element 26 is sandwiched therebetween. A thermal contact surface extending substantially continuously about the heater element 26 is thereby provided to enhance heat transfer surface area. In addition, the clip 54 has a length L greater than that of the fin 52 provided with the thermostat 50 which allows thermal contact to be achieved over a greater length of the heater element 26, thereby further increasing heat transfer surface area and shortening response time.

Figure 5:
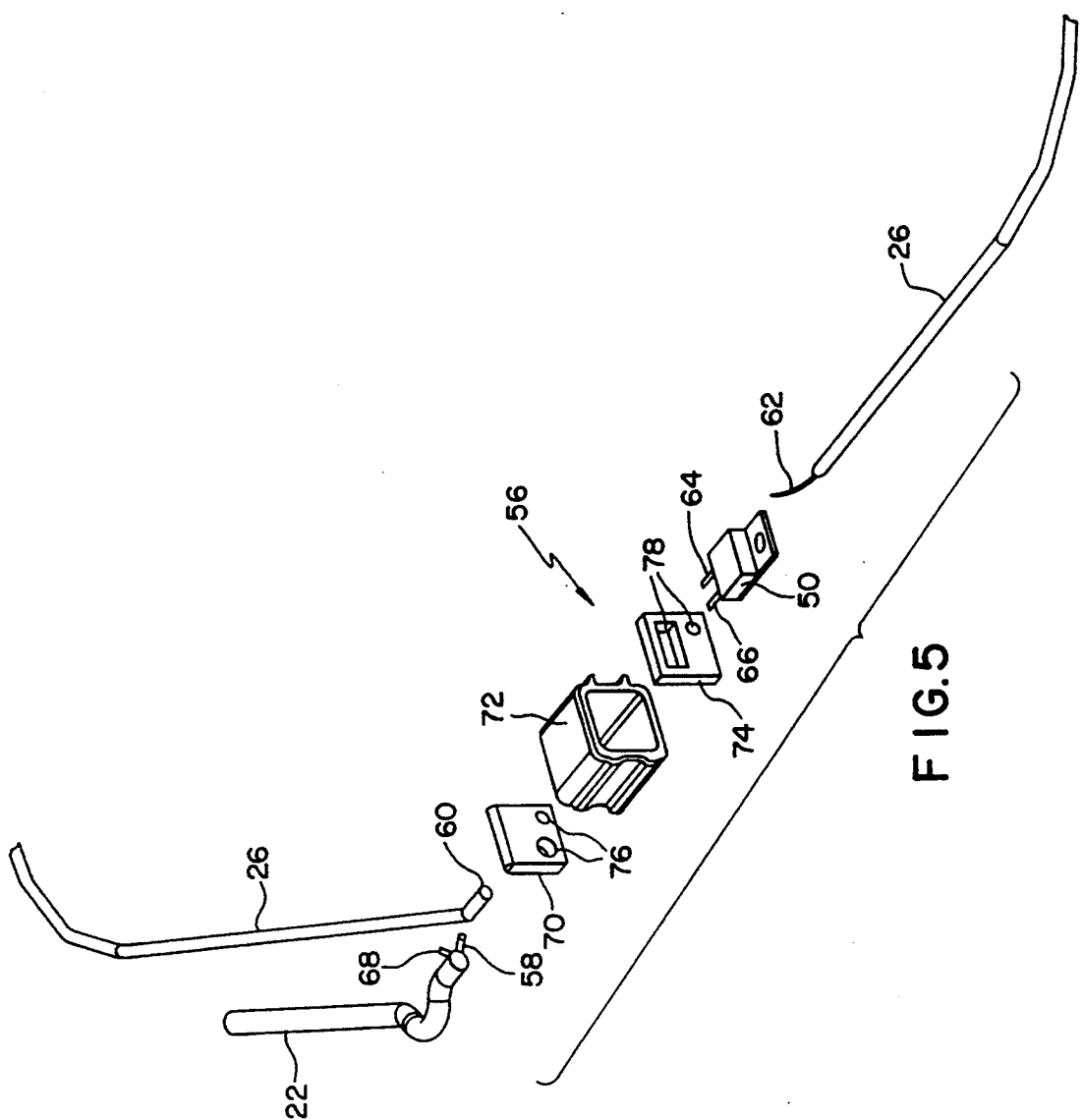
FIG. 5 is an exploded view of an apparatus for interconnecting wires in a sealed manner.
Figure 6:
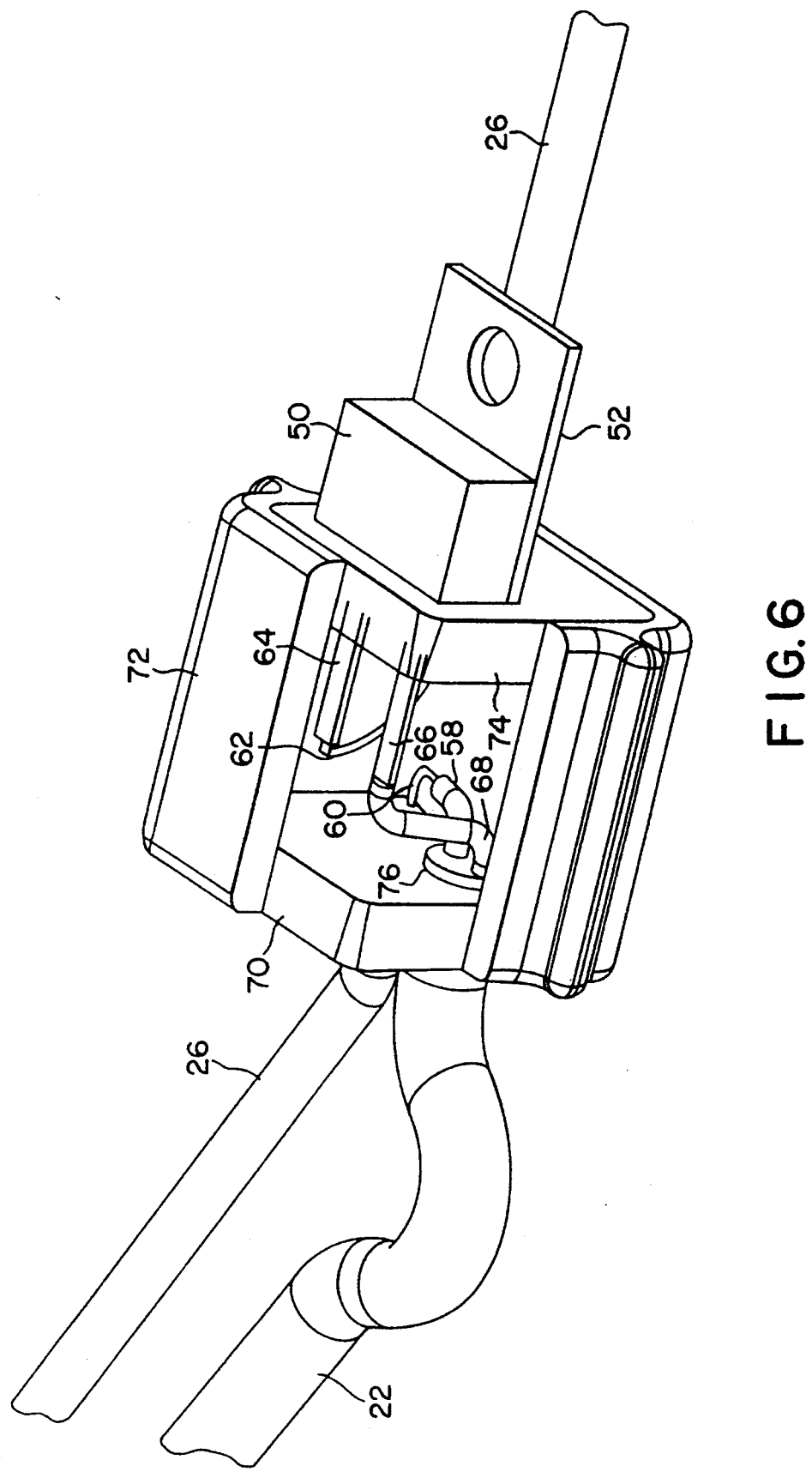
FIG. 6 is a perspective view, partially cut away, of the device of FIG. 5.

Referring to FIGS. 5 and 6, an exploded view and a perspective view, partially cut away, respectively, of an assembly 56 for interconnecting the heater element 26, the thermostat 50 and the line 22 from the control assembly 16 to the heater assembly 16 are shown. Inside the assembly 56, connections are made between a first end 58 of the line 22 and a first end 60 of the heater element 26, a second end 62 of the heater element 26 and a first lead 64 of the thermostat 50, and a second lead 66 of the thermostat 50 and a second end 68 of the line 22, thereby forming a portion of a completed electrical circuit. As is readily appreciated, it is desirable to maintain good connections between these members, even when tension forces are exerted thereon, in order to ensure proper functioning of the apparatus 10 and reduce the likelihood of electrical shock. However, maintaining good connections under tension is complicated because the thicknesses or gauges of the members 58, 60, 62, 64, 66 and 68 will typically vary, e.g., the thickness or gauge of the first end 58 of the line 22 will typically be greater than that of the first end 60 of the heater element 26.

The assembly 56 reduces or substantially eliminates tension forces on the connections. The assembly 56 comprises a first, compressible stopper 70, a substantially rigid sleeve 72 and a second, compressible stopper 74. The stoppers 70 and 74 can be formed from any suitable, compressible material including various plastics, rubbers and the like and the sleeve 72 can be formed from any suitable, substantially rigid material including various plastics, elastomers, metals, ceramics and the like. As shown, the first stopper 70 has openings 76 to accommodate the line 22 and the heating element 26 and the second stopper 74 has openings 78 to accommodate the heating element 26 and the thermistor 50. In addition, the stoppers 70 and 74 and sleeve 72 are dimensioned so that the stoppers 70 and 74 are compressibly received within the ends of sleeve 72. It will thus be appreciated that the openings 76 and 78 clamp down on and frictionally engage the line 22, heater element 26 and thermistor 50 when the stoppers 70 and 74 are inserted into the ends of the sleeve 72. Accordingly, tension forces are borne by the assembly 56 thereby reducing the likelihood that the connections therein will become separated while simultaneously, a substantially watertight seal is established between the stoppers 70, 74 and the sleeve 72. As an alternative to the illustrated sleeve 72 and stoppers 70, 74, a cylindrical sleeve with circular stoppers can be employed to achieve an improved watertight seal.

Figure 7:
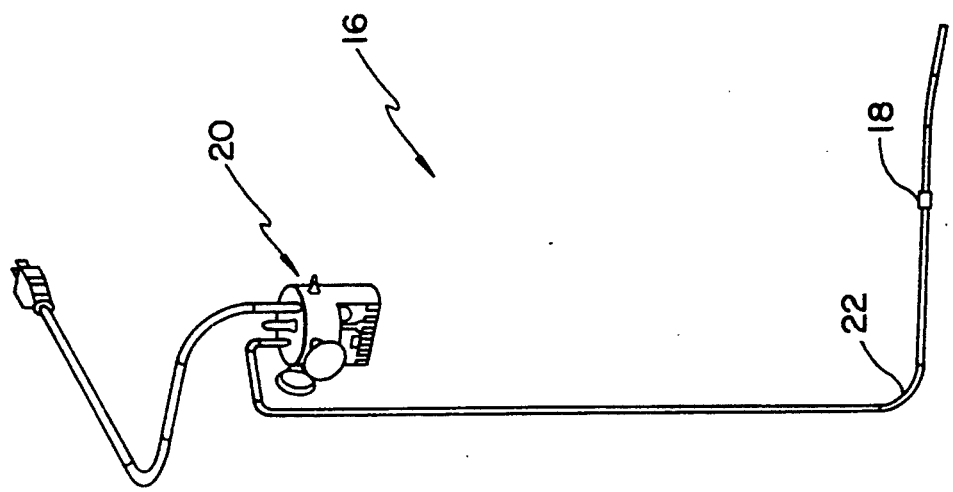
FIG. 7 is a perspective view of a control assembly with heater/sensor wire attached.
Figure 8:
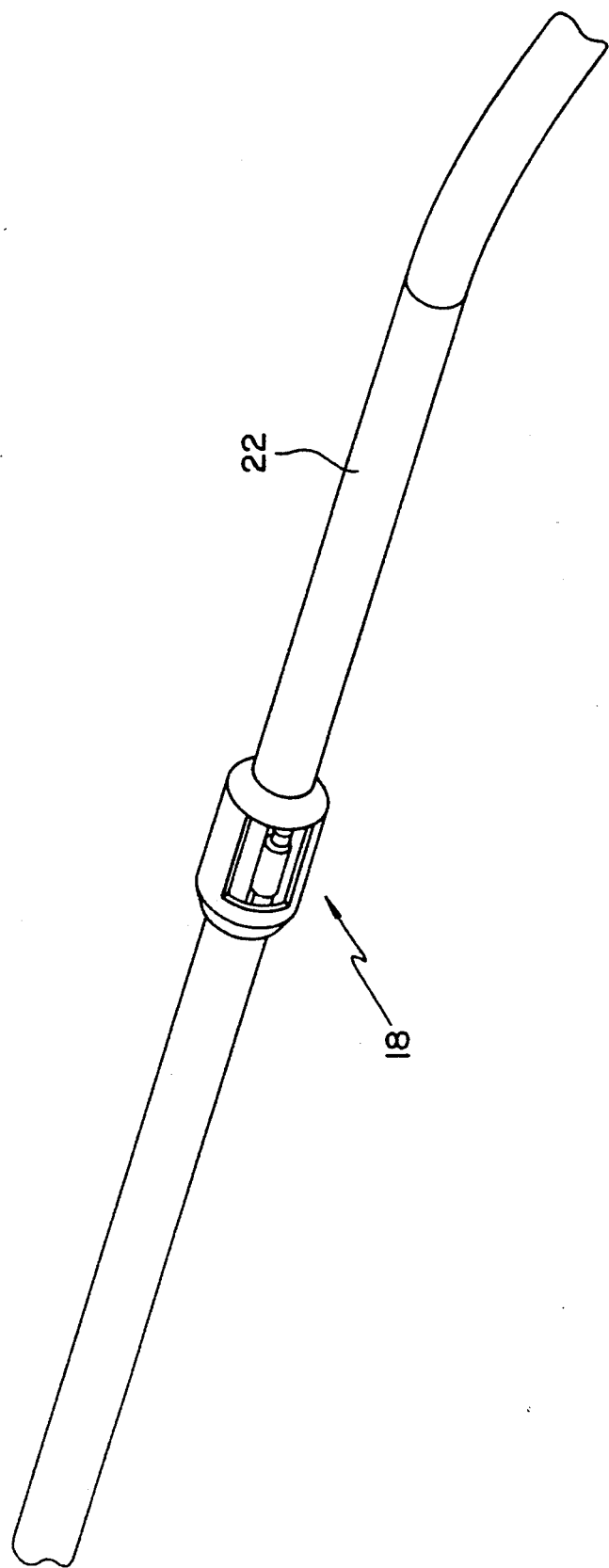
FIG. 8 is a perspective view, partially cut away, of a water temperature sensor.

Referring to FIGS. 7 and 8, the control assembly 16 comprises a control unit 20 interconnected with a water temperature sensor 18 which provides feedback to the control circuitry of unit 20. The sensor 18 can comprise a negative temperature coefficient (NTC) thermistor, positive temperature coefficient (PTC) thermistor, thermocouple or other device that, for example, varies its resistance to provide a signal indicative of water temperature. The sensor 18 can be positioned near the bottom of the aquarium 12 (FIG. 1) or other water container to reduce the likelihood that the sensor 18 will emerge from the water due to movement of the sensor, a drop in the aquarium water level or other reason. In addition, the sensor 18 can be positioned relative to the heater element 26 (see FIGS. 1-3) so as to reduce the likelihood of thermal feedback from the element 26. That is, the sensor 18 can be positioned far enough away from the heater element 26 so that the sensor 18 senses a water temperature which is relatively representative of water temperature throughout the aquarium 12 or water container rather than sensing the water temperature of a localized hot spot adjacent to the heater element 26. Moreover, the position of the element 18 can be fixed near the bottom of the aquarium by interconnecting the sensor to the aquarium 12, an aquarium component, under gravel, or the like. In the illustrated embodiment, the sensor 18 is integrally interconnected with the line 22 several inches from the heater element 26. Such a configuration has been found particularly advantageous in that assurance is thereby provided that the sensor 18 will remain submerged and, accordingly, aquarium safety is enhanced. If desired, the sensor 18 can be positioned under sand or gravel near the bottom of the aquarium 12 to enhance aquarium aesthetics and reduce the likelihood that the sensor 18 will be accidentally damaged or moved outside of the water.

Figure 9:
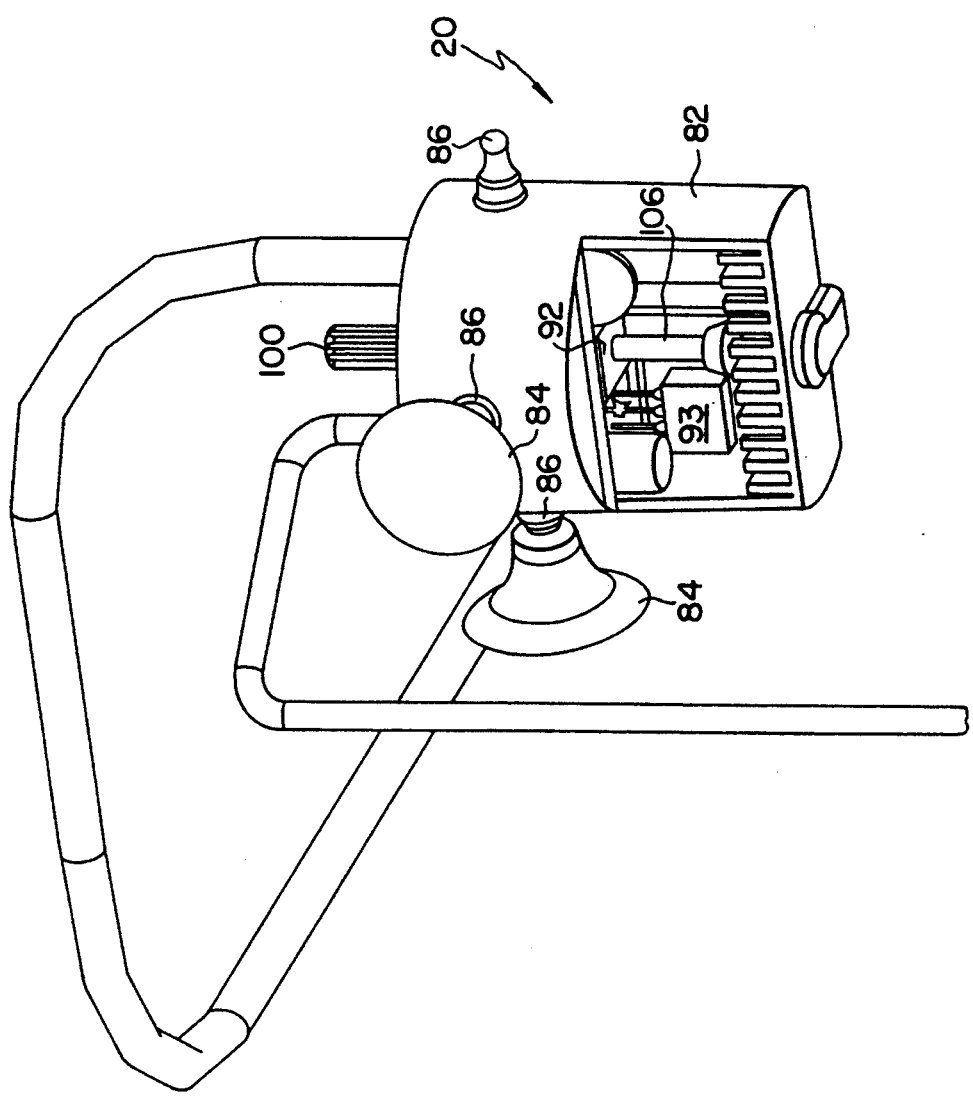
FIG. 9 is a perspective view, partially cut away, of a control unit.
Figure 10:
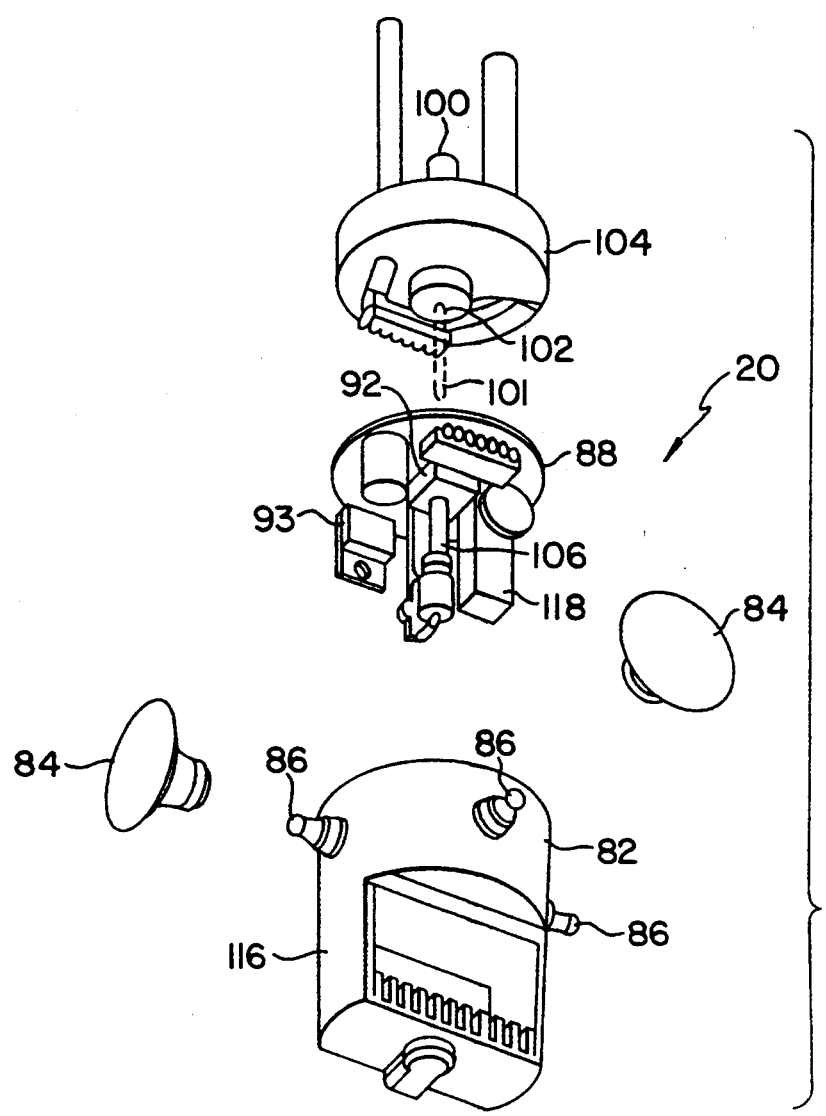
FIG. 10 is an exploded view of the control unit of FIG. 9.
Figure 11:
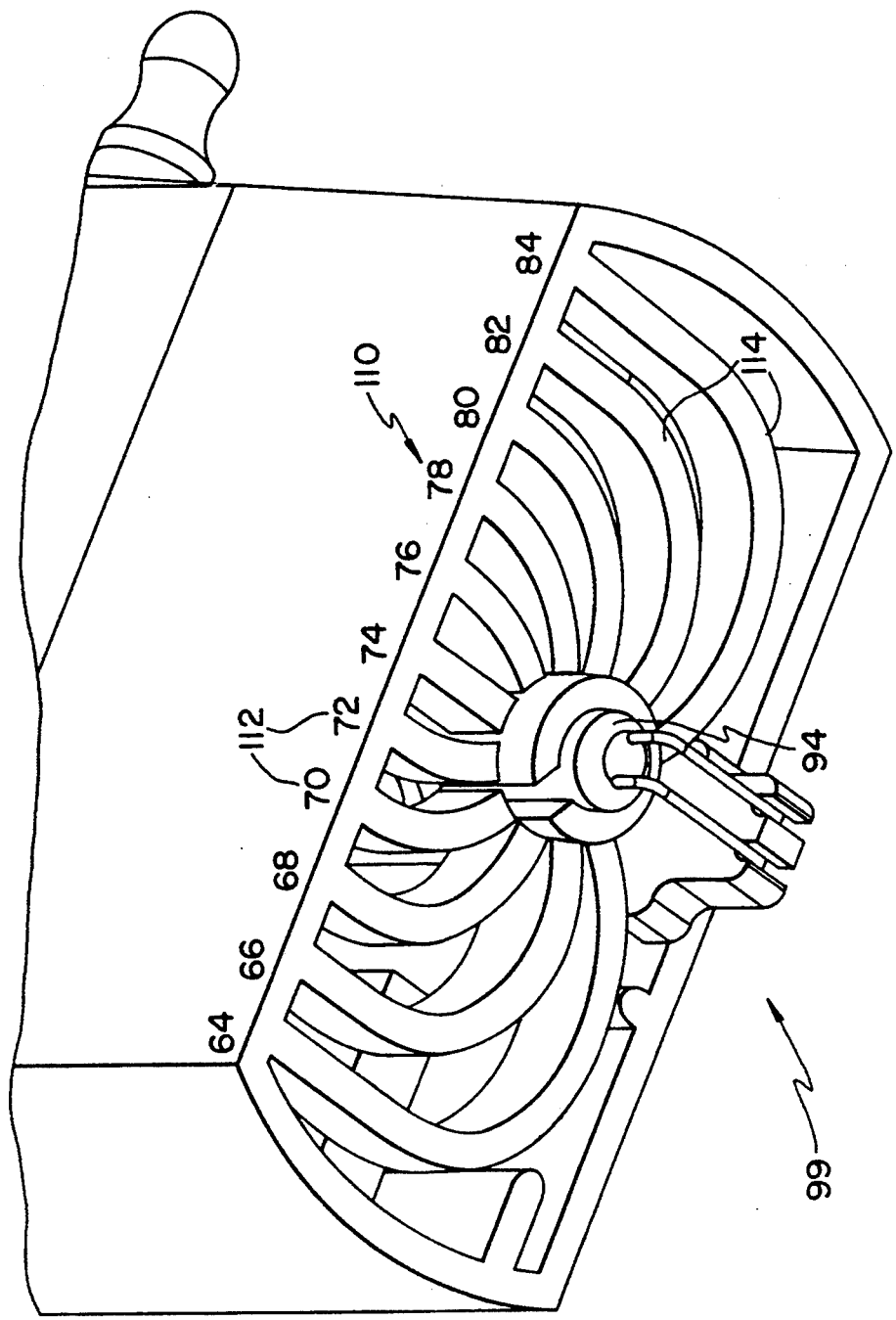
FIG. 11 is a partial perspective view, partially cut away, of the control unit of FIG. 9 which details the relationship of the light array elements and neon bulb.
Figure 12:
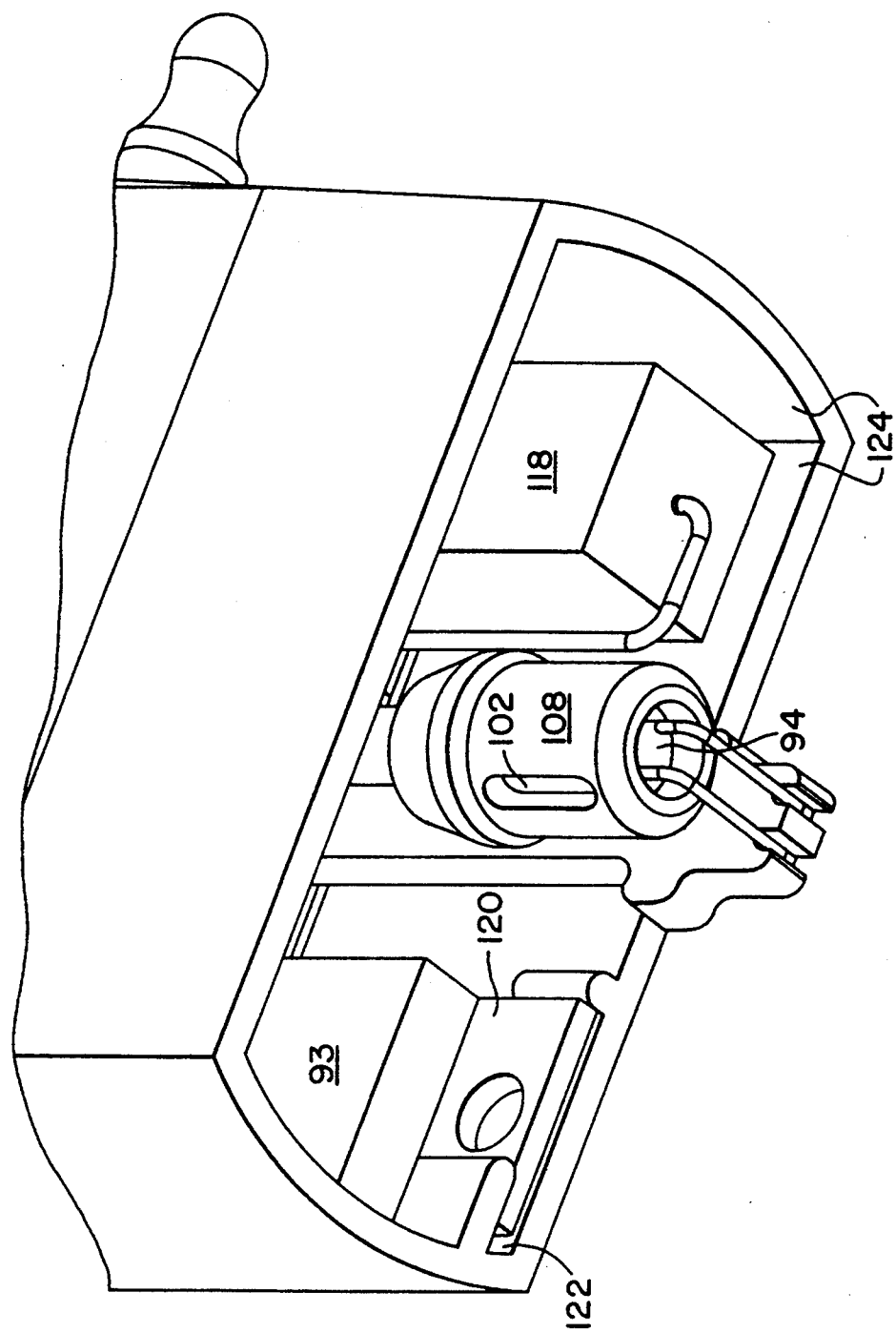
FIG. 12 is a partial perspective view, partially cut away, of the control unit of FIG. 9.

Referring to FIGS. 9 and 10, perspective and exploded views, respectively, of the control unit 20 are shown. Generally, the control unit 20 comprises control circuitry and related assemblies enclosed within a housing 82. Conveniently, the control unit 20 can be positioned near the top of the aquarium 12 (FIG. 1) for ease of access, either inside or affixed to the exterior. In this regard, the unit 20 may be provided with suction cups, clips, a hanger bracket or the like for attaching the unit 20 to the aquarium 12 or an aquarium cover or hood. The illustrated unit 20 is provided with suction cups 84 for attaching the unit 20 to walls of the aquarium 12. The suction cups 84 are removably, matingly secured to knobs 86 extending from the housing 82. The knobs 86 can be positioned on the housing 82 so as to allow the unit 20 to be positioned at various locations in the aquarium 12, e.g., at any edge thereof or in a corner.

Figure 13:
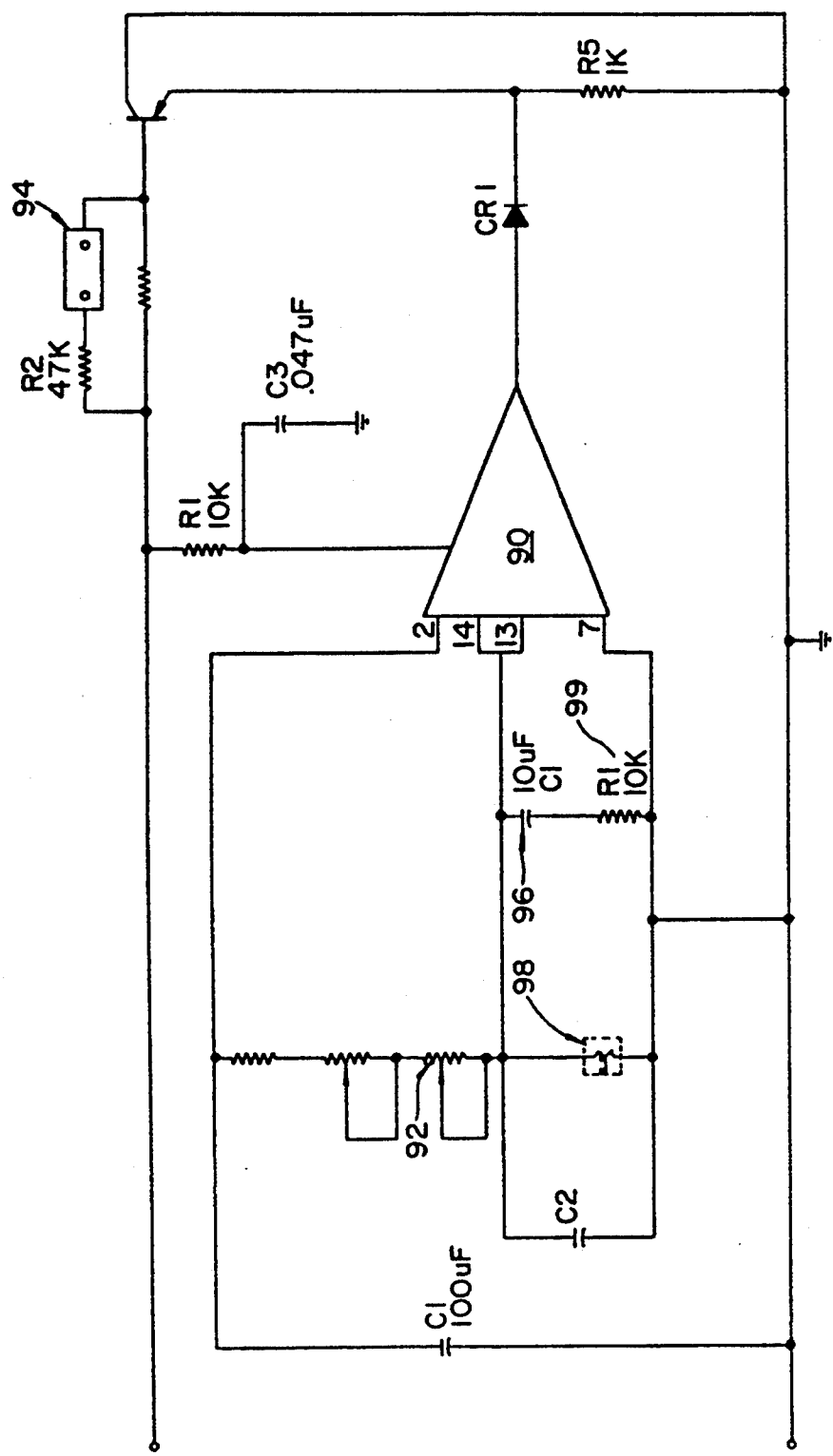
FIG. 13 is a circuit diagram of the control circuitry of the apparatus of FIG. 1.

The control circuitry, which is diagrammed in FIG. 13, can be partially fabricated on a circuit board 88 adapted for insertion into the housing 82. The circuitry includes an integrated circuit 90 connected as a zero voltage comparator for proportional control to an input voltage indicative of aquarium water temperature relative to a set point and generate an appropriate control signal, a potentiometer 92 for use in adjusting the set point, a thyristor 93 for controlling the current supplied the heater element 26 in response to the integrated circuit 90 output, an indicator light source 94 connected in parallel with the heater element to provide an indication of current flow through the heater element, and associated circuitry. It will thus be understood that the control circuitry provides on/off switching of current flow to the heater element responsive to a comparison of actual water temperature to desired water temperature.

A novel aspect of the circuitry relates to the 10 $\mu$F capacitor 96 connected in parallel with the thermistor 98 and connected in series with a 10K resistor 99. As noted above, the indicator light 94, a neon lamp, for example, that provides a visual indication when current flows through the heater element. Thus, the light 94 is intended to remain lit as the aquarium water is being heated towards a desired temperature and go out substantially as the water reaches the desired temperature. However, without the 10 $\mu$F capacitor 96, it has been found that the light 94 tends to flicker irregularly and erratically as the water temperature closely approaches the desired temperature, sometimes causing only one post of the neon lamp to illuminate. Ambiguous information is thereby provided as the user is uncertain whether the flickering indicates that the water temperature is closely approaching the desired temperature or that the circuitry is malfunctioning. The capacitor 96 causes electrical energy to be alternately stored and delivered such that the light 94 blinks at regular repetitive or flashing intervals, thereby providing a positive indication when the desired temperature is being approached. Further, if the temperature of the liquid environment extends increasingly below the desired temperature, the frequency at which the light 94 blinks diminishes until the light 94 remains lit, which, when a neon light is used results in both posts being turned on. Conversely, as the temperature in the liquid environment approaches the desired temperature, the frequency at which the light 94 blinks increases until the light goes off completely. At no time does only a single post of a neon light 94 become illuminated, which would cause the light array indication to become dim.

Referring now to FIGS. 9-12, the control unit 20 includes an active light array 99 for indicating the set point of the desired water temperature. The active display includes indicator light source 94 and a light pipe mechanism for selectively transmitting light from source 94 to light a portion of scale 110 to provide an indication of desired temperature. For example, an indication of desired temperature can be provided by selectively lighting markings 112 which can conveniently be provided in 2° F. or other marked increments across an appropriate temperature range. The mechanism for selectively transmitting light can comprise a movable optical strand or tube, such as a light pipe, defining a light transmission path directable towards the scale 110. Alternatively, a plurality of stationary optical strands or tubes defining separate light transmission paths between the source 94 and various portions of the scale 110 together with a movable collimator or cover at least partially surrounding the source 94 and having a slit to direct a beam of light to one of the plurality of tubes can be employed. Moreover, if the light must traverse a circuitous path before reaching the tube or array of tubes, a mirror to appropriately reflect light from the source 94 can be employed. In the illustrated embodiment, the active light display includes a bulb cover 108 having a slit 102 therein to allow passage of light and a plurality of optical strands, channels, or tubes 114 each having a first end adjacent to the source 94 and a second end adjacent to a marking 112 of scale 110. A particular marking can thus be illuminated by rotating the bulb cover 108 so that the slit 102 is aligned with the first end of the corresponding strand or tube 114. In this regard, the width of the slit 102 is substantially equal to or less than the distance between corresponding points on adjacent ones of the tubes 114 to assure that substantially only one of the tubes 114 is provided with light at any one time. It will be appreciated that the display provides a positive and easily readable indication of temperature in a variety of lighting conditions by focusing the spherically generated light from the light source 94 that passes through the slit 102 and is transmitted by one of the tubes 114 onto the desired marking 112. Further, by moving the light, temperature information is provided even in the absence of markings on the scale 110. Stated another way, the position of the light provided by one of the tubes 114 provides, by virtue of the illuminated tube's position relative to the other tubes, temperature related information.

The desired temperature can be set by rotating the control knob 100. The control knob is rotationally interconnected to a rod 101 (shown in phantom in FIG. 10) which extends downwardly through opening 102 of upper housing portion 104 through a complementary shaped (e.g., hexagonal) opening in a potentiometer 92, and into sleeve 106 which is integrally connected to the bulb cover 108 with slit 102. It will thus be appreciated that direct rotational slaving is achieved between knob 100 and the bulb cover 108. However, it will be understood that indirect rotational coupling, e.g., via gearing, could be provided if desired. It should also be noted that rod 101 is operationally associated with potentiometer 92 such that the temperature setting of the control circuitry can be correlated to the rotational orientation of the bulb cover 108. Thus, by turning knob 100, the user can simultaneously set the desired temperature and receive a visual indication of the temperature setting from scale 110.

It is an advantage of the present invention that the control unit can be easily assembled. The unit can be assembled by inserting rod 101 of upper housing portion 104 through prefabricated circuit board 88, and inserting portion 104 and circuit board 88 into lower housing portion 116. In this regard, the upper 104 and lower 116 housing portions can be friction fitted so that a watertight seal is provided by pressing the portions 104 and 116 together, or the portions can be sealably attached by adhesive bonding, ultrasonic welding or other techniques. The control circuitry includes certain elements, such as thyristor 93 and resistor 118, which can overheat in operation if insufficient heat dissipation is provided, thereby adversely affecting apparatus performance. It is therefore desirable to place such elements in thermal contact with the housing 82 so that the housing can function as a heat sink to dissipate heat. In the illustrated embodiment, thermal contact between the thyristor 93 and the housing 82, and between the resistor 118 and the housing 82, is established simultaneously with connection of the upper 104 and lower 116 housing portions, thereby simplifying construction. This is accomplished by providing the housing 82 and elements 93 and 118 with complementary, opposing heat transfer surfaces positioned such that the opposing surfaces come into thermal contact when the upper 104 and lower 116 housing portions are connected. Thus, the heat dissipation fin 120 of thyristor 93 is matingly received within slot 122 and resistor 118 abuts against inner walls 124 of housing 82 when the housing portions 104 and 116 are connected.

Figure 14:
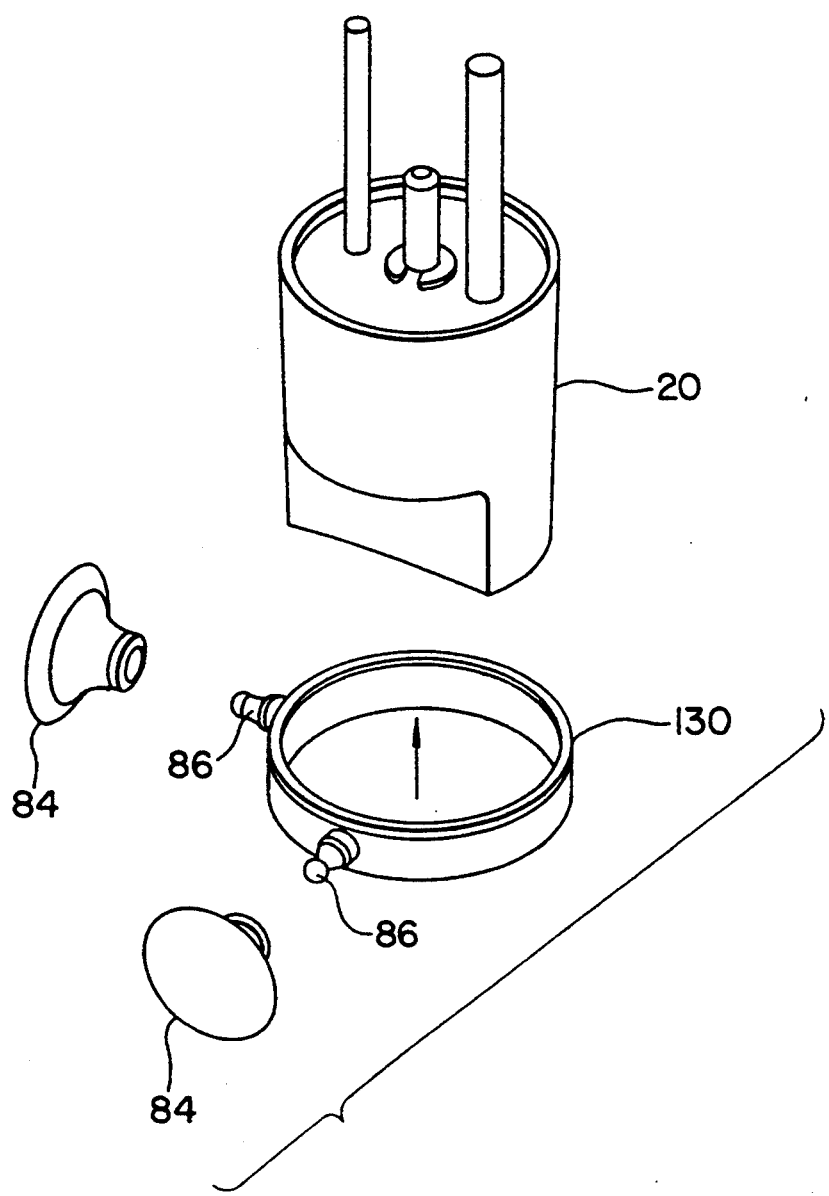
FIG. 14 is an exploded, perspective view of an embodiment of the controller that includes a removable mounting bracket assembly for engaging the controller housing.

FIG. 14 illustrates an alternate embodiment of the control assembly 16 in which the knobs 84 for mounting suction cups 86 reside on a ring bracket 130 that frictionally engages the circumference of the control unit housing 20. The ring bracket 130 can, if desired, be removed from the control unit housing 20 to permit other mounting bracket to be used. For example, a ring or semi-ring bracket with a hook for hanging the control unit housing from the edge of an aquarium or similar structure could replace the suction cup mount provided by the illustrated ring bracket 130.

Although the present invention has been described with respect to specific embodiments thereof, various changes and modifications, in addition to those cited above, may be suggested to one skilled in the art and it is intended that the present invention encompass such changes and modifications as fall within the scope of the appended claims. For example, the heater assembly 14 has been depicted and described herein as being located in an aquarium. However, the heater assembly can be used in other liquid environments, such as pet water bowls to keep the water therein from freezing, for example, and in garden ponds. Additionally, the active light display that moves a beam of light to provide temperature related information, while described in an embodiment in which the heater element is disposed in a liquid environment, can be used with heater assemblies in other environments, such as a home heating system.

What is claimed is:

1. A heater and control apparatus for use in regulating the temperature of a liquid, comprising:
    a heater element adapted for submersion in the liquid; and
    a controller, operatively associated with said heater element, wherein said controller includes a housing with a first housing portion that is substantially impervious to said liquid, support means for supporting said housing such that said first housing portion is located within the liquid and display means for providing temperature related information, said display means including:
    a substantially stationary light source;
    transmission means, associated with said light source, for providing a transmitted beam of light from said light source, said transmitted beam having a width;
    a plurality of indicators each separated from one another by a distance greater than said width of said transmitted beam; and
    means for selectively directing said transmitted beam from said substantially stationary light source to one of said indicators providing temperature related information.

2. The apparatus of claim 1, wherein:
said means for selectively directing includes a plurality of optical elements, each of said plurality of elements defining a light transmission path.

3. The apparatus of claim 1 wherein:
said transmission means comprises a cover for said light source that has opening disposed therein.

4. The apparatus of claim 1, wherein:
said display means is associated with an adjustable temperature setting means for use in defining a desired temperature for the liquid in which said heater element is disposed, said adjustable temperature setting means being accessible from above a free surface of said liquid, wherein adjustment of said adjustable temperature setting means causes said beam of light to move to provide an indication of temperature related information.

5. The apparatus of claim 1, wherein:
said transmission means comprises a cover having an opening therein to allow passage of light therethrough, the cover disposed at least partially around the light source, and said means for selectively directing comprises a rotatable knob operatively associated with the cover so that the position of said opening is changed by turning the knob.

6. The apparatus of claim 5, wherein:
said knob is operatively associated with a potentiometer to regulate said heater element.

7. The apparatus of claim 1, wherein:
said controller includes means for switching said light source on and off to provide temperature related information, wherein said means for switching turns said light source on when the liquid in which said heater element is disposed is below a desired temperature, turns said light source off when the liquid in which said heater element is disposed is above said desired temperature, and periodically turns said light source on and off when the liquid in which said heater element is disposed is slightly less than said desired temperature.

8. The apparatus of claim 1, wherein:
said means for selectively directing includes an element that defines a light transmission path from a first point to a second point, wherein said element is movable so that a position of said second point can change to provide temperature related information.

9. The apparatus of claim 1, wherein:
said means for selectively directing comprises a mirror to selectively reflect light from said light source.

10. The apparatus of claim 1, wherein:
said indicators are located within said first housing portion.

11. The apparatus of claim 10, wherein:
said first housing portion includes a substantially transparent portion that is located to permit viewing of said indicators.

12. The apparatus of claim 1, wherein:
said housing includes a second housing portion that said means for supporting supports above an exposed surface of said liquid.

13. The apparatus of claim 1, wherein:
said controller includes means for generating heat that is located in thermal contact with said first housing portion so that heat from said means for generating heat can be transmitted to said liquid along with the heat provided by said heater element.

14. A heater and control apparatus for use in regulating the temperature of a liquid, comprising:
    a heater element adapted for submersion in the liquid; and a controller, operatively associated with said heater element, wherein said controller includes a housing with a first housing portion that is substantially impervious to said liquid, support means for supporting said housing such that said first housing portion is located within the liquid, a light source, located within said housing, for providing a beam of light, and means for moving said beam of light to provide temperature related information, wherein:

said means for moving includes a plurality of elements, each of said elements providing a light transmission path and being separated from one another by a defined distance, said means for moving further including a cover disposed between said light source and said plurality of elements, said cover having an opening disposed therein and being movable to apply said beam of light to selected ones of said plurality of elements, wherein said opening is less than said defined distance between each of said plurality of elements so that said light beam is provided to substantially only one of said plurality of elements.

15. An apparatus for heating water in an aquarium and the like, comprising:

means for heating water that includes a housing having a first substantially planar wall and a second substantially planar wall with at least one of said first wall and said second wall being flexible, said first wall and said second wall being located so as to define an interface region therebetween, a heater element disposed in said interface region between said first and second walls but separated from at least one of said first and second walls, said heater element including at least first and second heater element sections that are substantially located in a plane and are substantially parallel to one another, and means for protecting said heater element from being damaged by contact with at least one of said first and second walls including a plurality of posts disposed in said interface region between said first and second walls, said plurality of posts comprising one post which is located at an inner portion of said interface region between and substantially adjacent to said first and second heater element sections; and a controller for controlling said means for heating.

16. The apparatus of claim 15, wherein:
said plurality of posts includes a post extending from said first wall towards said second wall.

17. The apparatus of claim 15, wherein:
said plurality of posts comprises a first plurality of posts extending from said first wall towards said second wall and a second plurality of posts extending from said second wall towards said first wall.

18. The apparatus of claim 17, wherein:
said first plurality of posts and said second plurality of posts are aligned so that posts of said first plurality abut against posts of said second plurality when said walls are urged together.

19. The apparatus of claim 15, wherein:
said heater element comprises an electrical resistance wire and said plurality of posts define a pathway for configuring the wire wherein at least three of said plurality of posts define a curved pathway through which a section of said heater element passes.

20. The apparatus of claim 15, wherein:
said heater element has a shape that produces a substantially even heat gradient across said heater element.

21. The apparatus of claim 15, wherein:
said heater element comprises an electrical resistance wire formed into a substantially planar spiral that has a center axis and a plurality of turns with successive turns extending increasingly outward from said center axis.

22. The apparatus of claim 15, wherein:
said housing is adapted to be deployed beneath sand or gravel near a bottom of the aquarium.

23. The apparatus of claim 15, wherein:
said housing includes at least one opening to allow penetration of water into said housing.

24. The apparatus of claim 15, wherein:
said housing includes an insulative material and at least one opening to allow penetration of water into said housing.

25. The apparatus of claim 15, wherein:
said heating element comprises an insulated heating wire located to be in direct contact with water.

26. The apparatus of claim 15, wherein:
said heating element comprises an insulated heating wire located so that water can contact said insulated heating wire continuously about a circumferential extent of said insulated heating wire.

27. The apparatus of claim 15, wherein:
said housing includes an insulative material and at least one opening to allow penetration of water into said housing; and
said heating element includes a wire that is located in said housing so that water can contact said wire about substantially the entire circumferential extent thereof.

28. The apparatus of claim 15, wherein:
said controller includes safety means for sensing the temperature of said heater element and limiting the operation of said heater element when said heater element reaches a defined temperature, as may occur upon removal of the heater element from the aquarium.

29. The apparatus of claim 15, wherein:
said controller includes means for sensing the temperature of said water, said means for sensing is operatively connected to a conduit that extends from said controller to said means for heating and provides electricity to said means for heating to substantially assure that water temperature information is being used to control said heater when said heater is located in the aquarium.

30. The apparatus of claim 15, wherein:
said controller includes a light source for providing a beam of light and means for moving said beam of light to provide temperature related information.

31. The apparatus of claim 15, wherein:
said controller includes a light source for providing a beam of light and means for turning said light source on and off to provide temperature related information, wherein said means for controlling causes said light source to turn on when the water in which said heater is located is below a desired temperature, causes said light source to turn off when the water in which said heater is located is above said desired temperature, and causes said light source to periodically turn on and off when the water in which said heater is located is about at said desired temperature.

32. The apparatus of claim 15, wherein:
said controller includes a case and a circuit with a heat generating component that is located inside said case, said case and said heat generating component being in substantially direct thermal contact so that heat from said heat generating component can be transmitted to the water along with the heat provided by said heater element.

33. The apparatus of claim 15, wherein:
said controller includes a housing and a bracket for use in mounting said housing on a surface, said bracket being removable from said housing.

34. The apparatus of claim 15, wherein:
said controller includes a housing that has a circumference and a ring-shaped bracket for use in mounting said housing to a surface, said ring-shaped bracket removably engaging said circumference of said housing.

35. The apparatus of claim 15, wherein:
said plurality of posts includes a first post and a second post, wherein said first post is substantially aligned with said second post between said first and second walls.

36. An apparatus for heating water in an aquarium and the like, comprising:
means for heating water that includes a heater element; and
a controller for controlling said means for heating, wherein:
said heater element comprises an electrical resistance wire formed in a substantially planar spiral having a center axis and a plurality of turns with successive turns extending increasingly outward from said center axis, wherein spacing between corresponding points on adjacent turns of said wire is greater near the center of said spiral than at more outward turns of said spiral.

37. An apparatus for heating water in an aquarium and the like, comprising:
means for heating water that includes a heater element; and
a controller for controlling said means for heating wherein said controller includes safety means for sensing the temperature of said heater element and limiting the operation of said heater element when said heater element reaches a defined temperature, as may occur upon removal of the heater element from the aquarium, said safety means including a sensor with a first thermal contact area that is in thermal contact with a first portion of said heater element and a switch for limiting operation of said heating element when said heating element reaches a defined temperature, said means for limiting further including a second thermal contact element in contact with a second portion of said heater element that is different than said first portion wherein said first and second thermal contacts combinatively cooperate with said switch to provide a fast reaction time.

38. The apparatus of claim 37, wherein said second thermal contact element shaped to conform to the contours of said electrical heater element along a length thereof.

39. The apparatus of claim 37, wherein said second thermal contact element has a length, relative to said heater element, that is greater than a length of said thermally conductive contact member of said safety unit.

40. An apparatus for heating water in an aquarium and the like, comprising:
means for heating water that includes a heater element; and
a controller for controlling said means for heating; and
means for connecting a first electrical lead associated with said heater element to a second electrical lead associated with said controller, said means for connecting including a sleeve with a first open end and a second open end, a first compressible stopper having a first opening to allow passage of said first electrical lead therethrough, and a second compressible stopper having a second opening to allow passage of said second electrical lead therethrough, wherein said first stopper compressingly engages said first end and said second stopper compressingly engages said second end such that clamping forces are exerted on said first and second leads so as to relieve stress on a connection between said first and second leads within said sleeve.

41. A heater and control apparatus for use in regulating the temperature of a liquid, comprising:
means for heating the liquid, said means for heating extending across a defined surface area and capable of delivering heat across said defined surface area, thereby defining an area of heat distribution, wherein heat delivered over a substantial portion of said area of heat distribution is substantially uniform to prevent damage to said means for heating; and
control means for controlling operation of said means for heating;
wherein said means for heating includes a plurality of heater element sections that are substantially located in a plane and substantially located parallel to one another, wherein the spacing between successive heater element sections changes.

42. A heater and control apparatus for use in regulating the temperature of a liquid, comprising:
means for heating the liquid, said means for heating extending across a defined surface area and capable of delivering heat across said defined surface area, thereby defining an area of heat distribution, wherein heat delivered over a substantial portion of said area of heat distribution is substantially uniform to prevent damage to said means for heating; and
control means for controlling operation of said means for heating;
wherein said means for heating includes a plurality of heater element sections that are substantially located in a plane and substantially located parallel to one another, wherein the spacing between successive heater element sections decreases toward an outer periphery of said plurality of heater element sections.

43. A heater and control apparatus for use in regulating the temperature of a liquid, comprising:
means for heating the liquid, said means for heating extending across a defined surface area and capable of delivering heat across said defined surface area, thereby defining an area of heat distribution, wherein heat delivered over a substantial portion of said area of heat distribution is substantially uniform to prevent damage to said means for heating; and control means for controlling operation of said means for heating;

wherein said means for heating comprises a heater element configured in a substantially planar spiral having a center axis and a plurality of turns with successive turns extending increasingly outwardly from said center axis, wherein spacing between angularly corresponding points on adjacent turns of said spiral is greater near the center of said spiral than at more outward turns of said spiral.

* * * * *